April 3, 1934.  E. L. HARDER  1,953,108
DIFFERENTIAL RELAYING SYSTEM
Filed Jan. 14, 1933
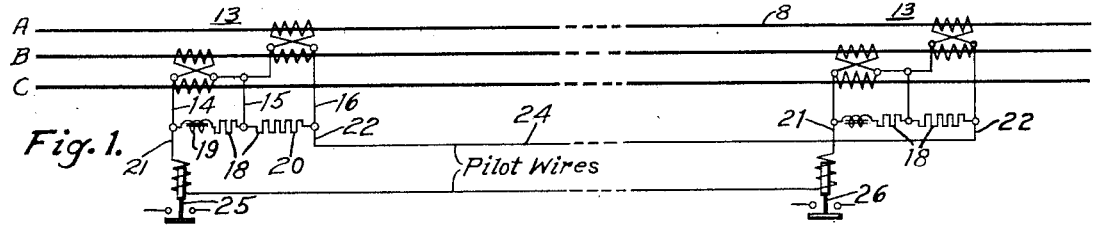
Fig. 1.
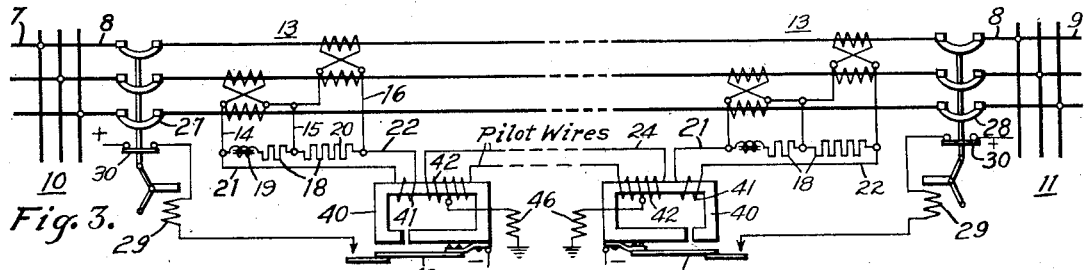
Fig. 2.
Fig. 3.
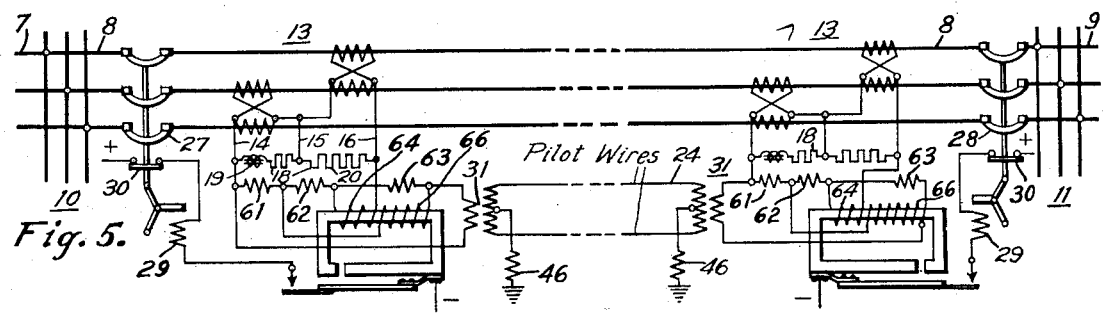
Fig. 4.
Fig. 5.
Fig. 6.
INVENTOR
Edwin L. Harder.
BY O. B. Buchanan
ATTORNEY Patented Apr. 3, 1934

1,953,108

UNITED STATES PATENT OFFICE 1,953,108

DIFFERENTIAL RELAYING SYSTEM

Edwin L. Harder, Forest Hills, Pa., assignor to Westinghouse Electric & Manufacturing Company, East Pittsburgh, Pa., a corporation of Pennsylvania Application January 14, 1933, Serial No. 651,835

20 Claims. (Cl. 175—294)

My invention relates to differential protective systems and it has particular relation, in its more limited aspects, to such systems utilizing pilot wires or the equivalent for comparing the currents at the two ends of a line-section of a polyphase transmission system.

I have ascertained, by mathematical investigation, that the positive phase-sequence components of the line currents in a polyphase transmission line are very satisfactory components for comparison, at the two ends of the line, as a means for determining the existence or nonexistence of a fault within that particular linesection. I have found that a comparison of positive-phase-sequence currents at the two ends of a transmission line-section will give a strong and reliable relaying indication for any fault of any conceivable nature which develops within the line-section being protected, while admirably lending itself to the avoidance of false indication in the event of a so-called "through" fault which is located in another line-section. These positive-phase-sequence components are moreover readily derived by means of well-known positive-phase-sequence networks which develop single-phase quantities, either voltages or currents, which are proportional, and in a predetermined phase relation, to the positive-phasesequence components of the line. Thus, singlephase relaying currents may be utilized to compare polyphase quantities, thus reducing to a very minimum the number of pilot wires or equivalent communicating channels necessary between the two ends of the line-section.

More specifically, my invention relates also to any differential relay which is provided with two coils each energized from a phase-sequence network or other means for responding selectively to a rotational phase-sequence quantity derived from polyphase line conductors on opposite sides of the electrical line or apparatus to be protected. By a rotational phase-sequence quantity, I mean a symmetrical component (of current or voltage) wherein the phases rotate, or have a phase difference between them, as distinguished from the zero-sequence components in which there is no phase rotation or phase displacement between the currents or voltages in the several phases.

My invention also has to do with several features relating to the practical operation and maintenance of pilot wires and other features connected with my above-mentioned invention, all of which are hereinafter described and claimed and illustrated in the accompanying drawing, wherein Figure 1 is a diagrammatic view showing the simplest connection of an exemplary phase-sequence network, at each end of a transmission-line section, said networks being connected to the line by means of current transformers, and being connected to each other by means of pilot wires, in such manner that substantially no current flows over the pilot wires during normal fault-free conditions in the line-section, there being a relay at each end of the pilot wire;

Fig. 2 is a more detailed view of a similar system, showing also the connection between the relays and the circuit breakers for clearing the line-section when it is faulted, showing the position of the line-section in a larger transmission system, and showing certain auxiliary features in connection with the pilot wires;

Fig. 3 shows my invention in another form of embodiment in which the positive-phase-sequence currents developed by the phase-sequence networks are normally circulated over the pilot wires and balanced, the one against the other;

Fig. 4 shows an alternative arrangement of the current-balance system of Fig. 3, with certain detail features in connection with the pilot wires;

Fig. 5 shows a voltage-balance system utilizing my invention in a bridge arrangement; and Fig. 6 is a simplified view of a similar bridge arrangement.

While balanced-current or differential protective systems in general are utilizable in many different applications, and while my system, in some of its broadest aspects, is also utilizable in many situations, such as the protection of any polyphase electrical instrumentality of a type which is so connected in use, as to have polyphase currents entering through polyphase conductors on one side thereof and polyphase currents leaving through polyphase conductors on another side thereof, or such as the protection, in general, of any two portions of a polyphase system, the currents of which are to be compared, I have illustrated my invention in connection with the particular example of a transmission-line section, since such illustration not only embodies the broad principles of polyphase current comparison which are embodied in my invention, but also embodies certain additional features which are necessitated by the special exigencies of pilot-wire protection.

As shown in Fig. 2, for example, my invention may be utilized on a three-phase transmission system comprising a plurality of line-sections 7, 8 and 9 which are separated by two distant relaying stations 10 and 11. Each of the sections, such as the middle section 8, may be protected by the apparatus of my invention, the consideration of which will possibly be facilitated by reference first to Fig. 1 which shows only the relaying connections (omitting the circuit breaker tripping connections) for a single line-section 8.

As shown in Fig. 1, each end of the line-section 8 is equipped with line-current transformers 13, which are connected in pairs so as to measure, respectively, the difference between the line-currents in phases B and C, and the difference between the line-currents in phases A and B. A current-transformer connection measuring two differences such as just described is utilized so as to eliminate the zero-phase-sequence components which, of course, are equal and in phase, in all three phases of the transmission line. The two differentially connected pairs of current-transformers 13 at each end of a line section are connected in series, so as to provide three terminals 14, 15, 16, in which only the positive-sequence and the negative-sequence components of the line-currents are reproduced, the zero-sequence components having been eliminated. It will be understood that any equivalent combination of current-transformers for deriving only rotational-phase sequence components may be utilized.

The rotational-sequence currents derived by the line-current transformers at each of the transmission-line sections are delivered to a phase-sequence network 18 which, in one of its simplest forms, as shown, may embody a 60° impedance 19 in one phase and a pure resistance 20 in another phase. The result of this connection is that the voltage-drop in the impedance 19 will lag 60° behind the current therein, but this current, for one of the rotational phase sequences, will be 60° in advance of the other current, so that the two voltage-drops in the two phases of the network 18 may be made to cancel out each other for a predetermined one of the rotational phase sequences, thus developing substantially zero terminal voltage or current conditions in the terminals 21 and 22 of the phase-sequence network. As to the other rotational phase-sequence component, the current in the impedance 19 will be lagging behind the current in the resistor 20, instead of leading it, so that definite currents or voltages will be produced in the terminal conductors 21, 22 of the network for this phase sequence. In this way, the network responds selectively to only one of the rotational phase-sequences, either the positive phase-sequence or the negative phase-sequence. In its broadest aspect, my invention applies to either of these rotational phase-sequences, but I find more general utility in the utilization of a positive-phase-sequence response.

There are two general ways in which to compare the electrical conditions (current or voltage) in the terminal conductors of the two phase-sequence networks at the two ends of the line-section. In the system utilized in Figs. 1, 2, 5 and 6, which I call a voltage-balance system, the voltages of the two networks are compared with each other, so that normally, that is, when there is no fault in the line-section being protected, the voltages developed across the terminals 21—22 of the two-phase-sequence networks at opposite ends of the line-section are substantially equal and in substantial phase opposition, so that no material current flows over the pilot wires which are designated by the numeral 24. This condition of voltage-balance holds both under normal power-conditions and in the event of a fault anywhere else but in the particular line-section being protected. If a fault occurs in the line-section being protected, there will be a reversal of current at one end of the line, or a cessation of current at one end of the line, and a current will be circulated over the pilot wires, thus tripping the two serially connected relays which are shown at 25 and 26 in Fig. 1.

In Fig. 2, the same system is utilized, with the same reference numerals, except that certain parts have been added. The circuit breakers have been shown, at each end of the line-section 8, as indicated at 27 and 28, said circuit breakers being provided with tripping coils 29 which are energized by means of the relays 25 and 26, respectively, the currents through the tripping coils being finally interrupted by back contacts 30 on the respective circuit breakers.

In Fig. 2, also, the pilot wires are connected to the respective phase-sequence networks 18 through step-down current transformers 31 for reducing the current flowing in the pilot wire, thereby reducing the voltage-drop in the pilot wire, and reducing the volt-ampere burden on the line-current transformers 13.

It will be observed that, in voltage-balance systems such as are shown in Figs. 1 and 2, there will normally exist a voltage-difference between the two conductors of the pilot-wire channel, but no currnt-flow in these conductors. It might easily happen that one or both of the pilot wires might break or become open-circuited, in which case nothing would happen until a fault should develop in the line-section to be protected, and the protective means would then fail to operate because of the open-circuit in the pilot wires. To provide against this contingency, I utilize, in accordance with my invention, some suitable means for operating an alarm in the event of a breakage in the pilot-wire channel, and by the word "alarm" I mean to include either a visible or audible signal for indicating the faulty-pilot-wire condition, relying upon the station attendant to correct that condition, as by the substitution of a sound pilot-wire channel, or a means for automatically doing that which it is expected that the attendant would do manually in response to a signal.

The so called "alarm" means (as just defined) is shown in Fig. 2 in one possible form of embodiment, comprising, at each end of the pilot wires 24, and before they are connected to the step-down current transformers 31, an over-current relay 33, the operating coil 34 of which is connected across the pilot wires. The mid-point of the relay coil 34 is grounded through an under-current relay 35, and one of the under-current relays 35, at one of the ends of the pilot wires, has connected in series with it a direct-current battery 36 which thus normally circulates a direct current through the two under-current relays 35 at the two ends of the pilot wires, said direct current passing non-inductively through the over-current relays 33. The direct current of the battery 36 is kept out of the step-down current transformers 31 by means of capacitors 37, which may be advantageously utilized to neutralize some or all of the reactance of the pilot-wire channel, including the reactance of the transformers 31.

With the "alarm" protective means just described, it will be obvious that either one of the pilot wires 24 breaks or becomes open circuited, the direct current flowing from the battery 36 will cease to flow in one half of each of the over-current relay coils 34 so that the current in one half of these coils will no longer be magnetically balanced by the battery current in the other half thereof, thus causing the over-current relays 33 to pick up and give the "alarm". If both pilot wires should break or become open-circuited, at the same time, it will be obvious that the current in the under-current relays 35 will be interrupted, thus also giving the alarm.

In any practical pilot-wire system, it is important to provide some means for taking care of the currents which are induced in the pilot wires, as by reason of the currents in the transmission line which is being protected. In particular, it is necessary to guard against the induced zero-phase-sequence currents, as, in any good pilot-wire cable, the pilot wires are so close together that all induced currents except the zero-sequence currents are of altogether negligible magnitude. The zero-sequence currents are currents which are flowing in the same direction at once, in both of the pilot wires. These currents flow as a result of zero-sequence voltages induced in the pilot wires, and these induced voltages may reach very dangerously high values, so as to endanger not only the insulation of the wires and the apparatus to which the wires are connected, but also to endanger the lives of the station attendants. It is usually necessary, therefore, to drain off the currents resulting from these induced zero-sequence voltages, and this I have done by my grounding of the mid-point of the current coils 34 of the over-current relays 33. In order to substantially prevent the zero-sequence currents from flowing through the under-current relays 35, I may shunt the operating coils of these relays by means of a capacitor 38.

In Fig. 3, I have shown my invention in an exemplary embodiment of what I call a current-balance system in which, instead of comparing the voltages developed by the phase-sequence networks and balancing one voltage against the other, as in Figs. 1 and 2, I compare the currents in the output terminals 21, 22 of the respective phase-sequence networks, balancing one current against the other. Thus, the current leaving the left-hand phase-sequence network 18 through the output terminal 22 thereof is caused to join with the current entering the right-hand phase-sequence network 18 through the terminal connection 21 of the latter, the circuit being completed by the joining of the two remaining output terminals, so that, when the two output currents of the respective phase-sequence networks 18 are substantially equal with each other and in substantial phase with each other, there will be a current circulating through the pilot wires, but there will be no voltage difference between the pilot wires except the voltage-drops in the wires themselves.

In Fig. 3, I have shown my invention as utilizing a differential relay 40 of a type utilizing two coils 41 and 42, the magnetizations of which are compared with each other; as distinguished from utilizing a differential relay of the type utilizing only one coil, as at 25 and 26 in Figs. 1 and 2, wherein the differential response is brought about by the electrical connections as distinguished from the magnetic connections. When the currents are substantially balanced, in the two phase sequence networks 18 of Fig. 3, there will be insufficient magnetic flux to pick up the movable armature 43 of the relay, but in the event of a fault in the line-section being protected, as previously explained, the two coils 41 and 42 will be energized substantially in phase co-incidence instead of phase opposition, thereby causing the armature 43 to be picked up, thus actuating the relay.

In Fig. 3, I utilize my two-coil differential relay 40 as a means for producing the effect of a step-down current transformer for reducing the current circulating in the pilot wires; which effect is produced by utilizing more turns in the coil 42 than in the coil 41. I also utilize the coil 42 as a means for draining the induced zero-sequence currents from the pilot wires, which is accomplished by grounding the mid-points of the coils 42 through suitable impedances 46, which limit the drainage currents to values which can be safely carried by the pilot wires.

In Fig. 4 I show another form of embodiment of the current-balance system in which, instead of using a two-coil balance relay 40, I utilize a simple over-voltage relay 48, the operating coil of which is connected across the end of the pilot wires, or preferably across the end of the high-current side of the step-down current-transformers 31. During normal conditions, that is, when there is no fault in the line-section being protected, the voltage appearing across the two-pilot wires 24 will be very small, as previously mentioned, being only that which is required to overcome the voltage drops due to the impedances of the pilot wires themselves. Under these conditions, the over-voltage relays 48 at the respective ends of the pilot wires will not pick up. However, when a fault occurs in the line-section being protected, the currents which previously circulated freely through the pilot wires will be in substantial opposition to each other, so that there will be no return path for said currents except through the over-voltage relays 48 which will thus be strongly energized, causing the actuation of the same.

If desired, I may produce the same effect as if the two over-voltage relays 48 at the opposite ends of the pilot wires were close together electrically, by inserting an impedance 50 in series with the pilot wires at each end thereof and between the point of conection of the over-voltage relay 48 and the phase-sequence network 18, said impedances having a value which is large compared to the effective impedance of the pilot-wire channel, so that most of the voltages developed by the respective phase-sequence networks 18 are consumed in the impedances 50, thus equalizing the voltages impressed across the operating coils of the over-voltage relays 48.

In Fig. 4 I also show an exemplified "alarm" means for guarding against certain faulty conditions in the pilot-wire channel. In this case, since a current-balance system is utilized, the pilot wires normally have little or no voltage across the same, so that the pilot-wire fault-condition to be safeguarded against is an actual short-circuiting of the pilot wires which, if not detected and guarded against, would produce no effect until there occurred a fault in the line-section to be protected, in which event there would not be proper protection of the line-section. I utilize therefore, in accordance with my invention, any suitable means for detecting the existence of a short-circuit between the pilot wires, and in Fig. 4 I illustrate one possible form in which such means may be embodied.

As shown in Fig. 4, the so called "alarm" means consists of a serially connected over-current relay 52 and a direct-current battery 53 at each end of one of the pilot wires, the two batteries 53 being connected with their polarities in opposition to each other, so that no battery current can flow unless there is a fault, in the pilot-wire cable, which provides a separate path for each of the battery currents 53. In general, it will be desirable to by-pass the over-current relays by means of capacitors 55 to provide for the flow of the single-phase relaying currents.

In Fig. 4, drainage of the zero-sequence currents induced in the pilot wires is provided for by grounding the mid-points of the pilot-wire sides of the step-down current-transformers 31, through suitable current-limiting impedances 46, as previously described.

In differential protective systems for balancing the polyphase line-currents, at opposite ends of a transmission system, against each other, as in Figs. 1 to 4 of this application, it is in many cases desirable, to utilize some sort of bridge arrangement whereby it is possible to enormously multiply the effects of the altered circuit conditions which are brought about by the occurrence of a fault in the line-section to be protected. Reference to Fig. 6 will show a simple schematic indication of such a bridge system embodying my invention and utilizing a bridge 60 at each end of the pilot wires 24. Each bridge consists of four legs or branches, the pilot wires 24 being connected in one leg and the other three legs comprising impedances of various kinds, as indicated very schematically at 61, 62 and 63. Said impedances may consist of various combinations of resistances and reactances, either inductive or capacitive. The output terminals 22, 21 of the phase-sequence network 18 are connected across one of the diagonals of each bridge, in series with one of the actuating coils 64 of a two-coil differential relay 65. The other coil 66 of this differential relay 65 is connected across the second diagonal of the bridge 60.

Various arrangements may be utilized for taking advantage of the change in the bridge circuit conditions which is brought about by the occurrence of a fault in the line-section to be protected. Thus, in Fig. 6, when there is normally no current in the pilot wires 24, the bridge may be designed so that a current flows in the two coils 64, 66 in the direction of the arrows, from which it will be observed that a portion of the total current is flowing through the restraining coil 66 of the relay, which may have more turns than the actuating coil 64, so as to enable it to produce a sufficiently close balance against the actuating coil in order to prevent the picking up of the relay under any conditions short of a fault within the line-section being protected. In the event of a fault in the line-section being protected, large currents will flow through the pilot wires 24, thereby changing the bridge circuit conditions, and the design of the bridge may be such as to cause a substantially zero-voltage-difference across the diagonal of the bridge which contains the restraining coil 66, thereby removing all or a portion of the restraint against the picking up or actuation of the relay 65, and giving a very strong and positive indication of the fault condition.

In the slightly modified bridge-balance system shown in Fig. 5, the impedances 61, 62 and 63 are indicated by the same numerals as in Fig. 6, as are also the two coils 64 and 66 of the relay 65. In this case, however, the differential relay 65 may be of a type having a single magnetic circuit, or of any equivalent type in which the phases as well as the magnitudes of the magnetomotive forces developed by the respective coils must be substantially balanced in order to prevent the operation of the relay. In this case, the bridge may advantageously be designed so that the current in the diagonal which contains the relay coil 66 may do more than merely reduce substantially to zero and may even reverse, upon the occurrence of a fault on the line-section being protected, thereby adding its magnetomotive force to that of the other relay coil 64 to give a strong positive relay action in response to such a fault. The necessary magnitudes and phases of the various impedances which make up the bridge 80 may be mathematically calculated and embodied in a large variety of different possible combinations, which may be worked out ad libitum in accordance with the operating principles herein explained.

In Fig. 5, I have shown what was omitted, for the sake of simplicity, in the simplified diagram of Fig. 6, namely the use of a step-down current-transformer 31, the pilot-wire side of which may be grounded through a current-limiting impedance 46 for drainage purposes.

While I have illustrated my invention in several forms of embodiment, I wish it to be distinctly understood that such forms are only illustrative and that, in its broadest aspects, my invention is susceptible of embodiment in many other forms and in many different applications other than those specifically shown in the drawing and described in the foregoing specification. I desire, therefore, that the appended claims shall be accorded the broadest construction consistent with their language and the prior art.

I claim as my invention:

1. Protective means for a three-phase electrical instrumentality of a type which is so connected, in use, as to have three-phase currents entering through three-phase conductors on one side thereof and three-phase currents leaving through three-phase conductors on another side thereof, said protective means comprising current-transformer means associated with the three-phase conductors at each side thereof for deriving, in each case, a polyphase derived current in which there can be substantially no zero-phase-sequence current, selective phase-sequence means at each side thereof for responding to said derived currents for developing, for relaying purposes, corresponding single-phase quantities responsive selectively to a single predetermined rotational phase-sequence component of the three-phase currents in each of said three-phase conductors, and differentially-responsive relay means responding to a predetermined condition of unbalance between said single-phase quantities.

2. Protective means for a three-phase electrical instrumentality of a type which is so connected, in use, as to have three-phase currents entering through three-phase conductors on one side thereof and three-phase currents leaving through three-phase conductors on another side thereof, said protective means comprising current-transformer means associated with each of said groups of three-phase conductors for deriving, in each case, two derived currents responsive respectively to two different differences between the currents in the conductors of two different pairs of conductors, a phase-sequence network associated with each group of three-phase conductors for receiving said two derived currents of that group, each of said phase-sequence networks being of a type which develops substantially zero terminal conditions when a predetermined one of said two derived currents is substantially equal in magnitude to the other one and sixty degrees displaced in a predetermined direction relative thereto, and differentially-responsive relay means responding to a predetermined condition of unbalance between said terminal conditions of the two phase-sequence networks.

3. Protective means for comparing conditions in two groups of three-phase line-conductors at different points, electrically, in a three-phase electrical system, said protective means comprising current-transformer means associated with the three transmission-line conductors at each point for deriving, in each case, a polyphase derived current in which there can be substantially no zero-phase-sequence current, line-current responsive selective phase-sequence means associated with the current-transformer means at each end of the line-section for developing, for relaying purposes, corresponding single-phase quantities responsive selectively to a predetermined rotational phase-sequence component of the line-currents, and means for comparing said quantities and for responding to a predetermined condition of unbalance between them.

4. Protective means for a three-phase transmission line having two distant relaying stations at opposite ends of a line-section thereof, said protective means comprising current-transformer means associated with the three transmission-line conductors at each end of the line-section for deriving, in each case, a polyphase derived current in which there can be substantially no zero-phase-sequence current, line-current-responsive selective phase-sequence means associated with the current-transformer means at each end of said line-section for developing, for relaying purposes, corresponding single-phase quantities responsive selectively to a predetermined rotational phase-sequence component of the line-currents, and means including differentially responding relay means and a relay-purpose communication channel between the ends of the line-section for comparing said quantities and for responding to a predetermined condition of unbalance between them.

5. Protective means for a three-phase transmission line having two distant relaying stations at opposite ends of a line-section thereof, said protective means comprising current-transformer means associated with the three-phase transmission-line conductors at each end of said line-section for deriving in each case, two derived currents responsive respectively to two different differences between the currents in the conductors of two different pairs of conductors, a phase-sequence network associated with each group of three-phase conductors for receiving said two derived currents of that group, each of said phase-sequence networks being of a type which develops substantially zero terminal conditions when a predetermined one of said two derived currents is substantially equal in magnitude to the other one and sixty degrees displaced in a predetermined direction relative thereto, a pair of pilot wires between the ends of said line-section, a differentially responding relay, and connecting means utilizing said pilot wires and differentially responding relay for responding to a predetermined condition of unbalance between the terminal conditions of the two phase-sequence networks.

6. Protective means for a three-phase transmission line having two distant relaying stations at opposite ends of a line-section thereof, said protective means comprising current-transformer means associated with the three-phase transmission-line conductors at each end of said line-section for deriving, in each case, two derived currents responsive respectively to two different differences between the currents in the conductors of two different pairs of conductors, a phase-sequence network at each end of said line-section for receiving said two derived currents of that end, each of said phase-sequence networks being of a type which develops substantially zero terminal conditions when a predetermined one of said two derived currents is substantially equal in magnitude to the other one and substantially sixty degrees displaced in a predetermined direction relative thereto, a pair of pilot-wires between the ends of said line-section, a differentially responding relay, connecting means utilizing said pilot wires and differentially responding relay for responding to a predetermined condition of unbalance between the terminal conditions of the two phase-sequence networks, and means for draining zero-sequence currents from said pair of pilot wires.

7. Protective means for a three-phase transmission line having two distant relaying stations at opposite ends of a line-section thereof, said protective means comprising line-current-responsive selective phase-sequence means associated with the three transmission-line conductors at each end of said line-section for developing, for relaying purposes, corresponding single-phase quantities responsive selectively to a predetermined rotational phase-sequence component of the line-currents, a pair of pilot wires between the ends of said line-section, a differentially responding relay, voltage-balance connecting means utilizing said pilot wires and said differentially responding relay for responding to a predetermined condition of unbalance between the two single-phase quantities, whereby substantially no current flows over the pilot wires during normal fault-free conditions in the line-section being protected, and alarm means for responding to breakage in said pair of pilot wires.

8. Protective means for a three-phase transmission line having two distant relaying stations at opposite ends of a line-section thereof, said protective means comprising line-current-responsive selective phase-sequence means associated with the three transmission-line conductors at each end of said line-section for developing, for relaying purposes, corresponding single-phase quantities responsive selectively to a predetermined rotational phase-sequence component of the line currents, a pair of pilot wires between the ends of said line-section, a multi-coil differential relay, and voltage-balance connecting means utilizing said pilot wires and said differential relay for responding to a predetermined condition of unbalance between the two single-phase quantities, said voltage-balance connecting means also including a bridge for energizing two coils of said differential relay from different diagonals of said bridge, the pilot wire being connected in one leg of the bridge, and the bridge being so adjusted that said two coils of the differential relay are sufficiently well balanced to prevent relay-operation during all fault-free conditions in said line-section.

9. Protective means for a three-phase transmission line having two distant relaying stations at opposite ends of a line-section thereof, said protective means comprising line-current-responsive selective phase-sequence means associated with the three transmission-line conductors at each end of said line-section for developing, for relaying purposes, corresponding single-phase quantities responsive selectively to a predetermined rotational phase-sequence component of the line-currents, a pair of pilot wires between the ends of said line-section, a multi-coil differential relay, and voltage-balance connecting means utilizing said pilot wires and said differential relay for responding to a predetermined condition of unbalance between the two single-phase quantities, said voltage-balance connecting means also including a bridge for energizing two coils of said differential relay from different diagonals of said bridge, and step-down current-transformer means for so connecting the pilot wire in one leg of the bridge that the current flowing in the pilot wire is reduced, and the bridge being so adjusted that said two coils of the differential relay are sufficiently well balanced to prevent relay-operation during all fault-free conditions in said line-section.

10. Protective means for a three-phase transmission line having two distant relaying stations at opposite ends of a line-section thereof, said protective means comprising line-current-responsive selective phase-sequence means associated with the three transmission-line conductors at each end of said line-section for developing, for relaying purposes, corresponding single-phase quantities responsive selectively to a predetermined rotational phase-sequence component of the line-currents, a pair of pilot wires between the ends of said line-section, a differentially responding relay, current-balance connecting means utilizing said pilot wires and said differentially responding relay for responding to a predetermined condition of unbalance between the terminal conditions of the two phase-sequence networks, whereby substantially equal and approximately co-phasal currents are circulated through the pilot wires during normal fault-free conditions in the line-section being protected, and alarm means for responding to a short-circuit in said pair of pilot wires.

11. Protective means for a three-phase transmission line having two distant relaying stations at opposite ends of a line-section thereof, said protective means comprising line-current-responsive selective phase-sequence means associated with the three transmission-line conductors at each end of said line-section for developing, for relaying purposes, corresponding single-phase quantities responsive selectively to a predetermined rotational phase-sequence component of the line-currents, a pair of pilot wires between the ends of said line-section, a differentially responding relay, and current-balance connecting means utilizing said pilot wires and said differentially responding relay for responding to a predetermined condition of unbalance between the terminal conditions of the two phase-sequence networks, said differential relay constituting a step-down current-transformer for reducing the current flowing in the pilot wire.

12. Protective means for a three-phase electrical instrumentality of a type which is so connected, in use, as to have three-phase currents entering through three-phase conductors on one side thereof and three-phase currents leaving through three-phase conductors on another side thereof, said protective means comprising current-transformer means associated with the three-phase conductors at each side thereof for deriving, in each case, a polyphase derived current in which there can be substantially no zero-phase-sequence current, selective phase-sequence means at each side thereof for responding to said derived currents for developing, for relaying purposes, corresponding single-phase components responsive selectively to the positive-phase-sequence component of the three-phase currents in each of said three-phase conductors, and differentially-responsive relay means responding to a predetermined condition of unbalance between said single-phase quantities.

13. Protective means for a three-phase electrical instrumentality of a type which is so connected, in use, as to have three-phase currents entering through three-phase conductors on one side thereof and three-phase currents leaving through three-phase conductors on another side thereof, said protective means comprising current-transformer means associated with each of said groups of three-phase conductors for deriving, in each case, two derived currents responsive respectively to two different differences between the currents in the conductors of two different pairs of conductors, a positive-phase-sequence network associated with each group of three-phase conductors for receiving said two derived currents of that group, each of said phase-sequence networks being of a type which develops substantially zero terminal conditions when a predetermined one of said two derived currents is substantially equal in magnitude to the other one and substantially sixty degrees displaced in a predetermined direction relative thereof, said predetermined direction being such that any negative-phase-sequence component of the polyphase currents in either of said groups of conductors produces substantially zero terminal conditions in the positive-phase-sequence networks, and differentially-responsive relay means responding to a predetermined condition of unbalance between said terminal conditions of the two positive-phase-sequence networks.

14. Protective means for comparing conditions in two groups of three-phase line-conductors at different points, electrically, in a three-phase electrical system, said protective means comprising current-transformer means associated with the three transmission-line conductors at each point for deriving, in each case, a polyphase derived current in which there can be substantially no zero-phase-sequence current, current-transformer means associated with the current-transformer means at each end of the line-section for deriving, in each case, two derived currents responsive respectively to two different differences between the currents in the conductors of two different pairs of conductors, a positive-phase-sequence network associated with each group of three-phase conductors for receiving said two derived currents of that group, each of said phase-sequence networks being of a type which develops substantially zero terminal conditions when a predetermined one of said two derived currents is substantially equal in magnitude to the other one and sixty degrees displaced in a predetermined direction relative thereto, said predetermined direction being such that any negative-phase-sequence component of the polyphase currents in either of said groups of conductors produces substantially zero terminal conditions in the positive-phase-sequence networks, and differentially-responsive relay means responding to a predetermined condition of unbalance between said terminal conditions of the two positive-phase-sequence networks.

15. Protective means for a three-phase transmission line having two distant relaying stations at opposite ends of a line-section thereof, said protective means comprising current-transformer means associated with the three-phase transmission-line conductors at each end of said line-section for deriving, in each case, two derived currents responsive respectively to two different differences between the currents in the conductors of two different pairs of conductors, a positive-phase-sequence network at each end of said line-section for receiving said two derived currents of that end, each of said phase-sequence networks being of a type which develops substantially zero terminal conditions when a predetermined one of said two derived currents is substantially equal in magnitude to the other one and sixty degrees displaced in a predetermined direction relative thereto, said predetermined direction being such that any negative-phase-sequence component of the polyphase currents in either of said groups of conductors produces substantially zero terminal conditions in the positive-phase sequence networks, and means including differentially responding relay means and a relay-purpose communication channel between the ends of the line-section for comparing the terminal conditions of the two positive-phase-sequence networks and responding to a predetermined condition of unbalance therebetween.

16. Protective means for a three-phase transmission line having two distant relaying stations at opposite ends of a line-section thereof, said protective means comprising current-tranformer means associated with the three-phase transmission-line conductors at each end of said line-section for deriving, in each case, two derived currents responsive respectively to two different differences between the currents in the conductors of two different pairs of conductors, a positive-phase-sequence network at each end of said line-section for receiving said two derived currents of that end, each of said phase-sequence networks being of a type which develops substantially zero terminal conditions when a predetermined one of said two derived currents is substantially equal in magnitude to the other one and sixty degrees displaced in a predetermined direction relative thereto, said predetermined direction being such that any negative-phase-sequence component of the polyphase currents in either of said groups of conductors produces substantially zero terminal conditions in the positive-phase sequence networks, a pair of pilot wires between the ends of said line-section, a differentially responding relay, connecting means utilizing said pilot wires and said differentially responding relay for responding to a predetermined condition of unbalance between the terminal conditions of the two positive-phase-sequence networks, and means for draining zero-sequence currents from said pair of pilot-wires.

17. Protective means for a three-phase transmission line having two distant relaying stations at opposite ends of a line-section thereof, said protective means comprising current-transformer means associated with the three-phase transmission-line conductors at each end of said line-section for developing, for relaying purposes, corresponding single-phase components, a pair of pilot wires between the ends of said line-section, a multi-coil differentially responding relay, and voltage-balance connecting means utilizing said pilot wires and said differentially responding relay for responding to a predetermined condition of unbalance between the two single-phase components, said voltage-balance connecting means also including a bridge for energizing two coils of said differential relay from different diagonals of said bridge, the pilot wire being connected in one leg of the bridge, and the bridge being so adjusted that said two coils of the differential relay are sufficiently well balanced to prevent relay operation during all fault-free conditions in said line-section.

18. Protective means for a three-phase transmission line having two distant relaying stations at opposite ends of a line-section thereof, said protective means comprising current-transformer means associated with the three-phase transmission-line conductors at each end of said line-section for developing, for relaying purposes, corresponding single-phase components, a pair of pilot wires between the ends of said line-section, a differentially responding relay, and current-balance connecting means utilizing said pilot wires and differentially responding relay for responding to a predetermined condition of unbalance between the two single-phase components, said differential relay constituting a step-down current-transformer for reducing the current flowing in the pilot wire.

19. Protective means for a three-phase transmission line having two distant relaying stations at opposite ends of a line-section thereof, said protective means comprising current-transformer means associated with the three transmission-line conductors at each end of the line-section for deriving, in each case, a polyphase derived current in which there can be substantially no zero-phase-sequence current, line-current-responsive selective phase-sequence means associated with the current-transformer means at each end of said line-section for developing, for relaying purposes, corresponding single-phase quantities responsive selectively to the positive phase-sequence component of the line-currents, and means including differentially responding relay means and a relay-purpose communication channel between the ends of the line-section for comparing said quantities and for responding to a predetermined condition of unbalance between them.

20. Protective means for a three-phase transmission line having two distant relaying stations at opposite ends of a line-section thereof, said protective means comprising current-transformer means associated with the three transmission-line conductors at each end of the line-section for deriving, in each case, two derived dissimilar-phase currents in which there can be substantially no zero-phase-sequence current, a phase-sequence network associated with the current-transformer means at each end of the line-section for receiving said two derived dissimilar-phase currents of that current-transformer means, each of said phase-sequence networks being of a type which develops substantially zero terminal conditions when a predetermined one of said two derived currents is substantially equal in magnitude to the other one and sixty degrees displaced in a predetermined direction relative thereto, and means including differentially responding relay means and a relay-purpose communication channel between the ends of the line-section for responding to a predetermined condition of unbalance between the terminal conditions of the two phase-sequence networks.

EDWIN L. HARDER.